United States Patent [19]

Rosenbaum et al.

[11] Patent Number: 4,571,460
[45] Date of Patent: Feb. 18, 1986

[54] ACTIVE IMPEDANCE LINE FEED CIRCUIT WITH IMPROVED GROUND FAULT PROTECTION

[75] Inventors: Stanley D. Rosenbaum; Calvin Plett, both of Ottawa, Canada

[73] Assignee: Northern Telecom Limited, Montreal, Canada

[21] Appl. No.: 588,156

[22] Filed: Mar. 12, 1984

[51] Int. Cl.⁴ .................. H04M 1/74; H04M 1/76; H04M 19/00
[52] U.S. Cl. .................. 179/16 AA; 179/16 F; 179/77; 179/170 NC
[58] Field of Search .................. 179/170 NC, 70, 77, 179/16 F, 16 AA, 18 FA, 170 R

[56] References Cited

U.S. PATENT DOCUMENTS

| | | | |
|---|---|---|---|
| 4,281,219 | 7/1981 | Cowpland et al. | 179/18 FA |
| 4,322,586 | 3/1982 | Mein et al. | 179/170 NC |
| 4,323,734 | 4/1982 | Kimzey | 179/18 FA |
| 4,375,015 | 2/1983 | Chambers, Jr. | 179/170 NC |
| 4,385,336 | 5/1983 | Takeshita et al. | 361/42 |
| 4,388,500 | 6/1983 | Regan | 179/170 NC |
| 4,472,608 | 9/1984 | Beirne | 179/170 NC |
| 4,473,719 | 9/1984 | Embree et al. | 179/18 FA |
| 4,476,350 | 10/1984 | Aull et al. | 179/70 |

FOREIGN PATENT DOCUMENTS 2093314 8/1982 United Kingdom .................. 179/77

OTHER PUBLICATIONS

"A High Voltage IC for a Transformerless Trunk and Subscriber Line Interface", Aull et al., IEEE Journal of Solid-State Circuits, vol. SC-16, No. 4, Aug. 1981, pp. 281-286.

Primary Examiner—Keith E. George
Assistant Examiner—R. Vaas
Attorney, Agent, or Firm—J. E. Moorhouse

[57] ABSTRACT

A typical active impedance line feed circuit includes tip and ring amplifiers being controlled to exhibit a.c. impedance and d.c. resistance characteristics for the purpose of supplying energizing current for tip and ring leads of a two wire communication line. Protection from excessive heat generation in an instant of a ground fault on the communication line is provided by a d.c. amplifier having an input resistively connected to the tip and ring leads and an output connected via a resistive unidirectional current path to an input of the ring amplifier. A ground fault occurrence causes the resistive unidirectional current path to become conductive and reduces the current flow in the ring lead by causing the output voltage of the ring amplifier to vary in the direction of ground potential. The output of the d.c. amplifier is also useful for improving circuit tolerance of longitudinal interference.

11 Claims, 3 Drawing Figures

ACTIVE IMPEDANCE LINE FEED CIRCUIT WITH IMPROVED GROUND FAULT PROTECTION

The present invention is in the field of line circuits for telephone systems and more particularly concerns active impedance line feed circuits as for example disclosed in any of copending patent application Ser. No. 386,871 filed 10 June, 1982, now U.S. Pat. No. 4,514,595, entitled "Active Impedance Line Feed Circuit"; Ser. No. 406,115 filed 6 Aug., 1982, now U.S. Pat. No. 4,484,032, entitled "Active Impedance Transformer Assisted Line Feed Circuit"; and Ser. No. 525,398 filed 22 Aug., 1983, now U.S. Pat. No. 4,539,438, entitled "Active Impedance Transformer Assisted Line Feed Circuit with Supervision Filtering".

BACKGROUND OF THE INVENTION

A typical active impedance line feed circuit includes tip and ring amplifier circuits being controlled to exhibit predetermined a.c. impedance and d.c. resistance characteristics for the purpose of supplying energizing current for a two wire communication line. These characteristics are determined by respective a.c. and d.c. feedback networks in association with an amplifier in the line feed circuit. One problem associated especially with an integrated circuit realization of an active impedance line circuit is that of heat dissipation. This problem can be extreme, particularly in an equipment shelf or housing containing a densely packaged group or groups of the active impedance line feed circuits. In one example of the in line feed circuit in application Ser. No. 386,871 filed 10 June, 1982 a diode is combined with the d.c. feedback network to limit feed current in the case of a short and hence low resistance communication line. As the line feed curent is thus limited in some of the line feed circuits in a typical group of the line feed circuits, the overall heat dissipation problem is likewise advantageously reduced. However, an occasional occurrence of a ground fault on the communication line may well cause individual heat induced circuit failure and in an extreme case failure of immediately adjacent circuits.

The potential severity of this problem is illustrated in the case of a low resistive fault connection from the ring terminal of an active impedance line circuit to ground, the communication line being otherwise open circuited, i.e., ON HOOK. In this case, current flows only in the ring feed resistor and the ring amplifier circuit of the line feed circuit. In this case, current limiting in the ring amplifier will occur only at about twice the level of normal loop current. Furthermore resultant heat generation is disadvantageously concentrated in one small area, that is at the ring amplifier circuit portion of the line feed circuit.

SUMMARY OF THE INVENTION

An active impedance line feed circuit for supplying direct energizing current from tip and ring amplifiers via tip and ring terminals to a two wire communication line, includes in accordance with the invention, a resistive signal path for carrying control signals to an input of the ring amplifier, a d.c. amplifier having an output and an input resistively connected to the tip and ring terminals, and a unidirectional resistive current path being connected from the input of the ring amplifier to the output of the d.c. amplifier. In an instant of a ground fault occurring in the communication line, the output of the d.c. amplifier causes the input at the ring amplifier to be modified such that a reduced amount of energizing current is conducted.

In one example of the invention, the output of the d.c. amplifier is resistively connected to each of tip and ring voltage taps at which voltage indication of tip and ring currents are provided. In this example common mode rejection characteristics of the control circuit are considerably relaxed while continuing to meet the common mode rejection operating requirements of typical telephone line interface circuits.

In another example the output of the d.c. amplifier is connected by respective resistors to the inverting input of the d.c. amplifier and to the tip and ring voltage taps. A bidirectional conductive circuit, for example a pair of diodes arranged in back-to-back parallel configuration, is connected between the junction of the three respective resistors and the junction of the output of the d.c. amplifier and the unidirectional resistive current path.

BRIEF DESCRIPTION OF THE DRAWINGS

An example embodiment of an active impedance line feed circuit with ground fault protection is described with reference to the accompanying drawings in which.

DESCRIPTION OF THE EXAMPLE EMBODIMENT

Figure 1:
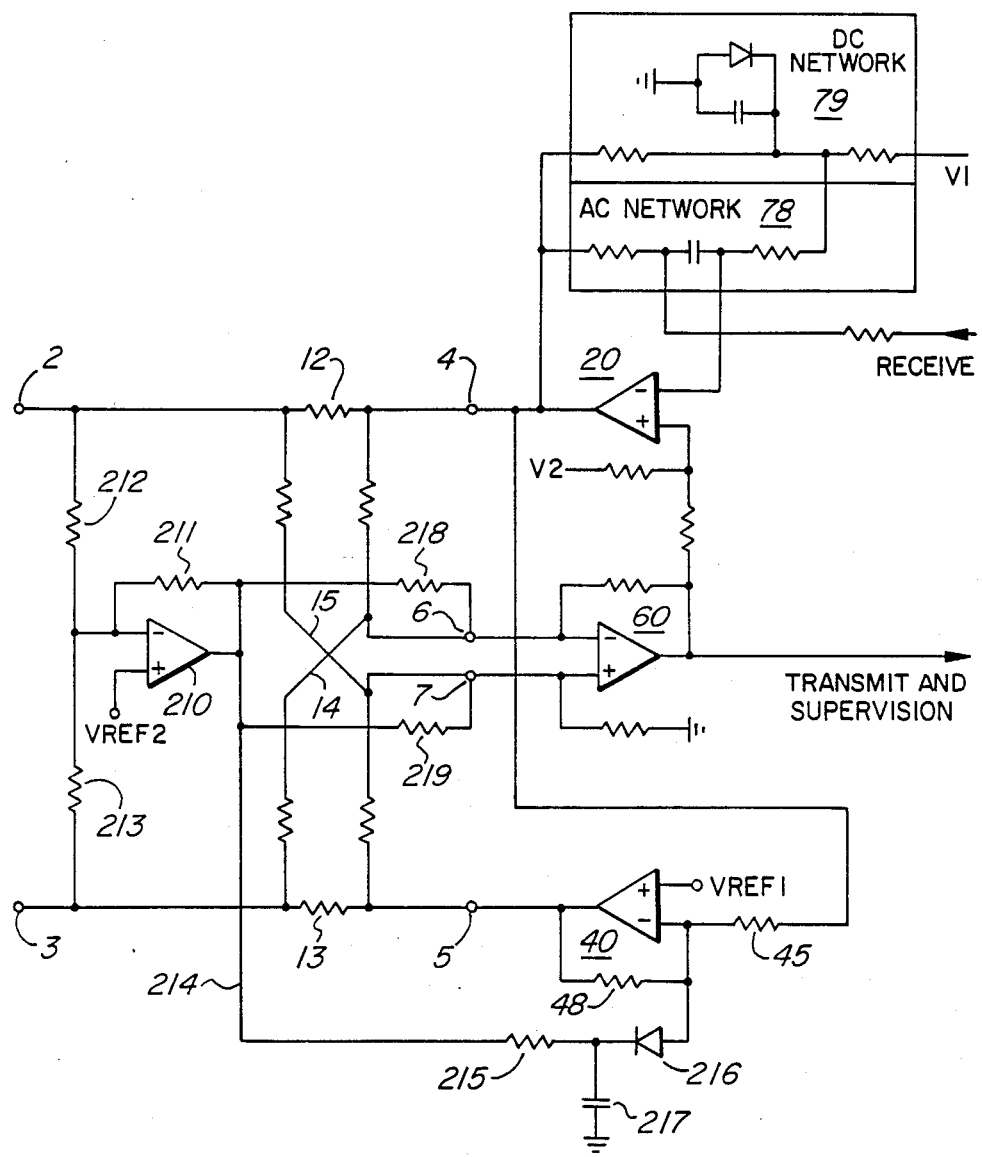
FIG. 1 is a schematic diagram of an active impedance line feed circuit in accordance with the invention.

Many aspects of the active impedance line feed circuit in FIG. 1 are similar to examples of line feed circuits described in the previously mentioned patent applications. Therefore many of the circuit elements are labelled similarly. However circuit elements not of the same function or not introduced in any of the previous patent applications are labelled distinctly therefrom.

Referring to FIG. 1, a tip feed resistor 12 is connected in series with a tip terminal 2 and an output terminal 4 of a tip amplifier circuit 20. A ring feed resistor 13, of ohmic value similar to that of the tip feed resistor 12, is connected in series with a ring terminal 3 and an output terminal 5 of a ring amplifier circuit 40. The tip and ring amplifier circuits 20 and 40 are typically powered from a battery in a telephone system, not shown, common to a plurality of line circuits. A tip voltage divider 14 includes a tip voltage tap 6 and is connected in series between the terminals 4 and 3. A ring voltage divider 15 includes a ring voltage tap 7 and is connected in series between the terminals 2 and 5. A control circuit 60 includes a differential input connected across the voltage taps 6 and 7 as shown. An output of the control circuit 60 is connected to a transmit and supervision lead for providing a.c. information signals and supervisory signals to the associated telephone system. The output of the control circuit 60 is also resistively connected to a non-inverting input of the tip amplifier circuit 20, as is a bias voltage source V2.

Resistors 45 and 48 are connected in series between the outputs of the tip and ring amplifier circuits 20 and 40, and a junction of the resistors 45 and 48 is connected to an inverting input of the ring amplifier circuit 40. It is preferable to have similar ohmic values for the resistors 45 and 48 to be similar so that the ring amplifier circuit 40 will operate as an inverse follower with a gain of one with respect to signals at the terminal 4. Operating a.c. impedance and d.c. resistance characteristics of the outputs of the tip and ring amplifier circuits are therefore similar and are determined primarily by a.c. and d.c. networks 78 and 79 connected as shown between the output and the inverting input of the tip amplifier circuit 20.

Circuit elements identified with labels in a range of 210–219 in combination with the active impedance line feed circuit as thus far described, provide for improved ground fault protection and common mode rejection.

In more detail, a differential amplifier circuit, hereafter referred to as a d.c. amplifier 210 includes an output being resistively coupled via resistors 218 and 219 to the tip and ring voltage taps 6 and 7 respectively. The output is also connected to the inverting input of the ring amplifier circuit 40 via a unidirectional resistance current path 214 which includes a diode 216 connected in series with a resistor 215 as shown. In this example a capacitor 217 is connected between ground and a junction of the resistor 215 and the diode 216. An inverting input of the amplifier 210 is connected to the output of the amplifier 210 by a resistor 211, and is also connected to the tip and ring terminals 2 and 3 by resistors 212 and 213 respectively.

In operation, an output signal from the amplifier 210 is the inverse of common mode signals appearing at the tip and ring terminals 2 and 3. The amplifer 210 is substantially non-responsive to differential signals, such as normally occur in transitions between ON HOOK and OFF HOOK as well as for normal voice signals because the values of the resistors 212 and 213 are chosen to be closely similar. The output of the amplifier 210 is coupled via the resistors 218 and 219, which are also chosen to be closely similar, to the tip and ring voltage taps 6 and 7, such that common mode signals normally appearing at the tip and ring voltage taps 6 and 7 via the tip and ring voltage dividers 14 and 15, are substantially eliminated. This is a benefit in that the common mode rejection characteristics of the control circuit 60 are conveniently relaxed while at least maintaining a required overall common mode immunity characteristic of the active impedance line circuit.

In the case of a ground fault, the input of the amplifier 210 tends to rise toward ground which in turn causes the output signal from the amplifier 210 to become more negative to restrain the input voltage, via the resistor 211, to a potential of VREF2. If the output signal becomes sufficiently negative, the signal path 214 becomes conductive via the diode 216. With a further decrease in ground fault resistance, the signal from the output of the amplifier 210 is coupled to the inverting input of the ring amplifier circuit 40. This causes the output voltage at the terminal 5 to be less negative which reduces the flow of ground fault current.

A threshold of ground fault current limiting corresponds to a threshold of conduction of the diode 216. One means of adjusting the threshold of conduction of the diode 216 is by choosing appropriate potentials for VREF1 and VREF2. However it is important for maintaining longitudinal balance that the diode 216 does not come into conduction during normal loop operation. This is a serious limitation, as longitudinal interference causes input signals to be applied to the amplifier 210 from both tip and ring terminals 3 and 4, whereas a severe ground fault causes input from substantially only the ring terminal 3. Therefore in the active impedance line circuit in FIG. 1, the threshold of ground fault current at which the diode 216 begins to conduct must be set at a level which is twice the permissible peak longitudinal current at either of the tip and ring terminals 2 or 3. Since a typical longitudinal current tolerance of up to 30 milliamperes of peak alternating current may be required of the active impedance line feed circuit, there still may be a significant heat dissipation problem during a ground fault condition.

This heat dissipation problem can be overcome in the example embodiment by at least two solutions, briefly, a limited choice of values of the resistor 215 or the addition of the capacitor 217 as shown in FIG. 1 or both.

Figure 2:
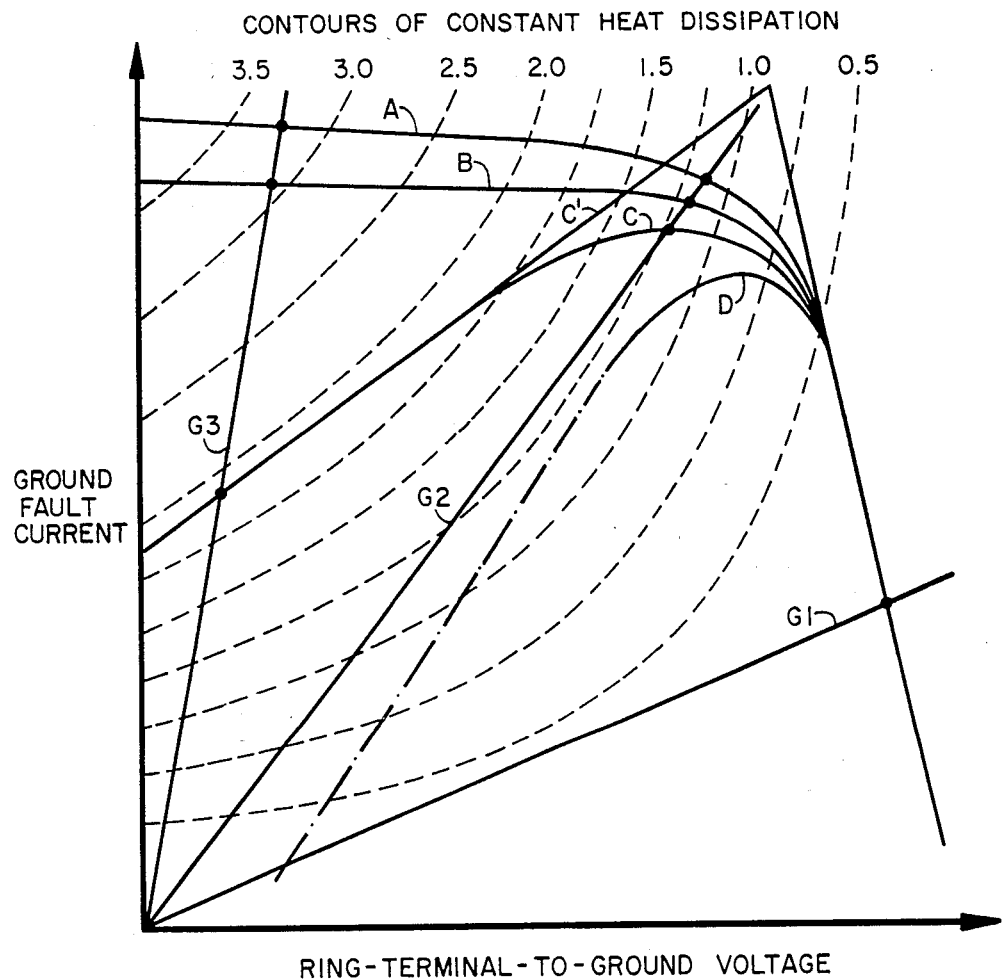
FIG. 2 is a graphical illustration of various example operating characteristics in the presence of a ground fault, for which the circuit in FIG. 1 can be designed.

The first solution involves the value of the resistor 215 being less than that required for holding ground fault current constant at the threshold level. The lesser value of the resistor 215 in operation results in a fold down or crowbar characteristic, which is illustrated in the graph in FIG. 2. In FIG. 2 a vertical axis represents ground fault current and a horizontal axis represents voltage as would be measured between the ring terminal 3 and ground. Various values of the resistor 215 correspond to operating characteristic curves A, B, C and D. Various ground fault resistances, with a communication line being connected at the tip and ring terminals 2 and 3 and being in an ON HOOK state, are represented by load lines G1, G2, and G3. Intersections of the lines G1–G3 with the curves A–D illustrate actual operating conditions. Heat dissipation in the tip amplifier circuit 40 and the ring feed resistor 13 is calculated as the product of the ground fault current with the voltage drop between the negative battery supply voltage and the ring terminal 3. Dotted line curves in FIG. 2 are plotted in accordance with these calculations and represent contours of levels of heat generations between 3.5 and 0.5 watts. If the value of the resistor 215 is chosen to obtain a ground fault current similar to line C, it is seen that as the ground fault resistance decreases the ground fault current firstly increases toward the threshold of conduction of the diode 216, then reaches a maximum and thereafter decreases. The maximum curring dissipation of heat is indicated by the highest wattage contour level reached. In this respect curve C is preferable to curve B. Curve B has a similar fault current threshold, and therefore a similar longitudinal interference signal tolerance, but results in a greater heat dissipation than curve C. Curve C is also probably preferable to curve D. It may be unacceptable to assign such value to the resistor 215 so as to obtain operating characteristics similar to curve D. This curve intersects with some load lines at more than one point. Part of curve D is represented by a broken line which corresponds to an unstable region of operation, wherein d.c. latch-up is likely. If a latch-up occurs and normal conditions are later restored, the line circuit will not return to normal operation unless some positive action is taken, such as removal and restoration of the battery supply.

The second solution for improving upon the heat dissipation problem is to connect the capacitor 217 between ground and the junction of the resistor 215 and the diode 216. The value of the capacitor 217 should be large enough to provide in combination with the resistor 215 a low pass filter so as to prevent longitudinal signals at local AC power distribution frequency from influencing conduction in the diode 216. In this case the ground fault current threshold can be set as low as is required without regard for longitudinal signal interference.

Figure 3:
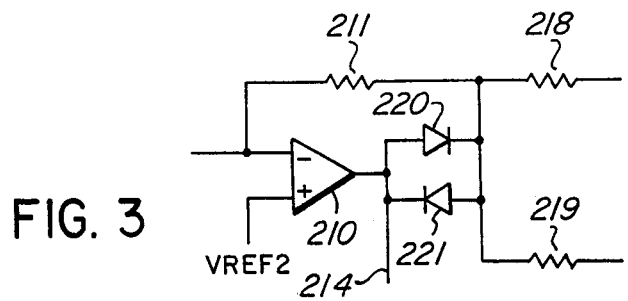
FIG. 3 is a schematic diagram illustrating an alternative embodiment of part of the active impedance line feed circuit in FIG. 1.

Another embodiment of the invention, as shown in FIG. 3, includes diodes 220 and 221 being connected in parallel back-to-back configuration between the output of the amplifier 210 and the junction of the resistors 211, 218 and 219. In this embodiment it is preferred that the potentials of VREF1 and VREF2 are about the same, and further that these potentials are similar to an average of voltages which would appear at the voltage taps 6 and 7 during operation at about a predetermined threshold of ground fault current. In contrast to the circuit in FIG. 1, where the amplifier 210 is operated with a fairly high gain to provide a stable ground fault protection threshold and significant improved common mode signal reduction at the voltage taps 6 and 7, the circuit of FIG. 3 provides for sharp and stable definition of the ground fault condition in the presence of a much lower value of the resistor 211. The lower value of the resistor 211 extends the linear range of the amplifier 210 so that it remains in a substantially linear operating condition even in the extreme case of ringing signals applied to the associated telephone line. The resistors 215, 218 and 219 are also proportionately lower in ohmic value.

In the normal state of operation the average of the voltages at the tip and ring terminals 2 and 3 is more negative than the potential of VREF1 and VREF2. Thus the output of the d.c. amplifier 210 is more positive than the VREF potential and therefore the diode 220 is conductive and the diodes 216 and 221 are non-conductive.

In a transition to ground fault state the average of the voltages of tip and ring terminals 2 and 3 become more positive than the VREF potential, causing the diode 220 to become non-conductive. Momentarily the diode 221 remains in the non-conductive state, thereby permitting the amplifier 210 to tend toward open loop gain in the absence of feedback normally supplied via the resistor 211. The output of the d.c. amplifier 210 rapidly swings sufficiently negative to cause the diode 221 to become conductive, which also causes the diode 216, in the path 214 to become conductive. This restrains the conduction of the tip amplifier circuit 40.

The ground fault protection operating characteristics of the circuit embodiment in FIG. 3 are an improvement in contrast with the operating characteristics of the circuit embodiment in FIG. 1. Firstly, linear operation of the d.c. amplifier 210 is extended by a proportionate lowering of the values of the resistors 211, 215, 218 and 219. Secondly, the arrangement of the additional diodes 220 and 221 provides a much sharper threshold definition of transition between normal and ground fault conditions of operation. This is exemplified by a curve C' in FIG. 2. Thirdly, when it is arranged that the diodes 216 and 221 are of similar structure and electrical characteristics, the threshold of transition is more stable, being substantially independent of temperature variations during circuit operation.

What is claimed is:

1. An active impedance line feed circuit comprising: tip and ring amplifiers being responsive to a control signal being proportional to currents in tip and ring feed resistors for supplying energizing current and a.c. information signals to a two wire communication line via tip and ring terminals connected to outputs of the tip and ring amplifiers by the tip and ring feed resistors respectively, tip and ring voltage dividers including tip and ring voltage taps respectively, a control circuit for generating the control signal and having a differential input connected across the tip and ring voltage taps, and a d.c. amplifier having an inverting input resistively connected to the tip and ring terminals and an output resistively connected to the tip and ring voltage taps.

2. An active impedance line feed circuit as defined in claim 1 further comprising a unidirectional current path being connected between an input of the ring amplifier and the output of the d.c. amplifier, whereby in an instance of a ground fault or the like occurring along a wire of the communication line, current flow via the ring amplifier is restrained.

3. An active impedance line feed circuit as defined in claim 1 wherein first and second resistors are connected between the output of the d.c. amplifier and the tip and ring voltage taps respectively, and a third resistor is connected between the output and the inverting input of the d.c. amplifier, the active impedance line feed circuit further comprising:
bidirectional conductive means for conducting current in response to at least a predetermined voltage, the bidirectional conductive means being connected between the output of the d.c. amplifier and the junction of the first, second and third resistors; and
a unidirectional current path being connected between an input of the ring amplifier and the junction of the bidirectional conductive means and the output of the d.c. amplifier;
whereby in an instance of a ground fault or the like occurring along a wire of the communication line, current flow via the ring amplifier is restrained.

4. An active impedance line feed circuit as defined in claim 2 wherein the unidirectional current path comprises a unidirectional current conductive device being connected in series with the input of the ring amplifier and a resistor being connected in series between the output of the d.c. amplifier and the unidirectional current conductive device.

5. An active impedance line feed circuit as defined in claim 2;
wherein each of the tip, ring and d.c. amplifiers have inverting and non-inverting inputs, the output of the tip amplifier being resistively connected to the inverting input of the ring amplifier, the non-inverting inputs of the tip amplifier and the d.c. amplifier each being connected to a voltage source of predetermined potential, the output of the d.c. amplifier being connected by respective resistances to the inverting input of the d.c. amplifier and to the tip and ring voltage taps;
wherein the unidirectional current path includes a first diode; and
wherein the active impedance line feed circuit further comprises second and third diodes being connected in back-to-back parallel configuration between the junction of said respective resistances and the junction of the output of the d.c. amplifier and the unidirectional current path, at least one of the second and third diodes being of a structure similar to the structure of the first diode.

6. An active impedance line feed circuit as defined in claim 2 wherein:
each of the tip, ring and d.c. amplifers have inverting and non-inverting inputs, the output of the tip amplifier being resistively connected to the inverting input of the ring amplifier, the non-inverting inputs of the tip amplifier and the d.c. amplifier each being connected to a voltage source of predetermined potential, the output of the d.c. amplifier being connected by respective resistances to the inverting input of the d.c. amplifier and to the tip and ring voltage taps;

wherein the unidirectional current path incudes a first diode; and wherein the active impedance line feed circuit further comprises second and third diodes being connected in back-to-back parallel configuration between the junction of said respective resistances and the junction of the output of the d.c. amplifier and the unidirectional current path.

7. An active impedance line feed circuit as defined in claim 4 in which a capacitor is connected between ground and a junction of the unidirectional current conductive device and the resistor.

8. An active impedance line feed circuit as defined in claim 4;

wherein each of the tip, ring and d.c. amplifiers have inverting and non-inverting inputs, the output of the tip amplifier being resistively connected to the inverting input of the ring amplifier, the non-inverting inputs of the tip amplifier and the d.c. amplifier each being connected to a voltage source of predetermined potential, the output of the d.c. amplifier being connected by respective resistances to the inverting input of the d.c. amplifier and to the tip and ring voltage taps;

wherein the unidirectional current path includes a first diode; and wherein the active impedance line feed circuit further comprises second and third diodes being connected in back-to-back parallel configuration between the junction of said respective resistances and the junction of the output of the d.c. amplifier and the unidirectional current path, at least one of the second and third diodes being of a structure similar to the structure of the first diode.

9. An active impedance line feed circuit as defined in claim 4:

wherein each of the tip, ring and d.c. amplifiers have inverting and non-inverting inputs, the output of the tip amplifier being resistively connected to the inverting input of the ring amplifier, the non-inverting inputs of the tip amplifier and d.c. amplifier each being connected to a voltage source of predetermined potential, the output of the d.c. amplifier being connected by respective resistances to the inverting input of the d.c. amplifier and to the tip and ring voltage taps;

wherein the unidirectional current path includes a first diode; and wherein the active impedance line feed circuit further comprises second and third diodes being connected in back-to-back parallel configuration between the junction of said respective resistances and the junction of the output of the d.c. amplifier and the unidirectional current path.

10. An active impedance line feed circuit as defined in claim 7:

wherein each of the tip, ring and d.c. amplifiers have inverting and non-inverting inputs, the output of the tip amplifier being resistively connected to the inverting input of the ring amplifier, the non-inverting inputs of the tip amplifier and the d.c. amplifier each being connected to a voltage source of predetermined potential, the output of the d.c. amplifier being connected by respective resistances to the inverting input of the d.c. amplifier and to the tip and ring voltage taps;

wherein the unidirectional current path includes a first diode; and wherein the active impedance line feed circuit further comprises second and third diodes being connected in back-to-back parallel configuration between the junction of said respective resistances and the junction of the output of the d.c. amplifier and the unidirectional current path, at least one of the second and third diodes being of a structure similar to the structure of the first diode.

11. An active impedance line feed circuit as defined in claim 7;

wherein each of the tip, ring and d.c. amplifiers have inverting and non-inverting inputs, the output of the tip amplifier being resistively connected to the inverting input of the ring amplifier, the non-inverting inputs of the tip amplifier and d.c. amplifier each being connected to a voltage source of predetermined potential, the output of the d.c. amplifier being connected by respective resistances to the inverting input of the d.c. amplifier and to the tip and ring voltage taps;

wherein the unidirectional current path includes a first diode; and wherein the active impedance line feed circuit further comprises second and third diodes being connected in back-to-back parallel configuration between the junction of said respective resistances and the junction of the output of the d.c. amplifier and the unidirectional current path.

* * * * *